US007924914B2

(12) United States Patent
Saxena

(10) Patent No.: US 7,924,914 B2
(45) Date of Patent: Apr. 12, 2011

(54) DYNAMICALLY CONFIGURING A VIDEO DECODER CACHE FOR MOTION COMPENSATION

(75) Inventor: Rahul Saxena, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1604 days.

(21) Appl. No.: 11/231,077

(22) Filed: Sep. 20, 2005

(65) Prior Publication Data

US 2007/0064006 A1    Mar. 22, 2007

(51) Int. Cl.
*H04B 1/66* (2006.01)
*H04N 7/12* (2006.01)
*H04N 11/02* (2006.01)
*H04N 11/04* (2006.01)
*G06K 9/36* (2006.01)

(52) U.S. Cl. .................................. 375/240.01; 382/236

(58) Field of Classification Search .......... 375/240–241; 382/236

See application file for complete search history.

(56) References Cited

U.S. PATENT DOCUMENTS

| | | | | |
|---|---|---|---|---|
| 5,923,375 A * | 7/1999 | Pau | ........................... | 375/240.01 |
| 5,973,740 A * | 10/1999 | Hrusecky | ................. | 375/240.15 |
| 6,442,206 B1 * | 8/2002 | Hrusecky | ................. | 375/240.21 |
| 6,470,051 B1 * | 10/2002 | Campisano et al. | ..... | 375/240.21 |
| 2003/0002584 A1 * | 1/2003 | Campisano et al. | ..... | 375/240.21 |
| 2003/0138045 A1 * | 7/2003 | Murdock et al. | ......... | 375/240.12 |
| 2006/0120456 A1 * | 6/2006 | Tasaka et al. | ............ | 375/240.16 |
| 2006/0176262 A1 * | 8/2006 | Fujine et al. | .................... | 345/98 |
| 2006/0291560 A1 * | 12/2006 | Penna et al. | ............. | 375/240.16 |

FOREIGN PATENT DOCUMENTS

| | | |
|---|---|---|
| WO | WO 02/056600 | 7/2002 |
| WO | WO 2005/034516 | 4/2005 |

OTHER PUBLICATIONS

Chen et al., *Memory Performance Optimizations for Real-Time Software HDTV Decoding*, Multimedia and Expo, 2002, ICME '02 Proceedings, 2002 IEEE International Conference on Lausanne, Switzerland, Aug. 26-29, 2002, Piscataway, NJ, USA, IEEE, US, vol. 1, Aug. 26, 2002, pp. 305-308.

* cited by examiner

*Primary Examiner* — Aaron W Carter
(74) *Attorney, Agent, or Firm* — Trop, Pruner & Hu, P.C.

(57) ABSTRACT

A video decoder cache used for motion compensation data may be dynamically reconfigured. In some embodiments, it may be reconfigured on picture or frame boundaries and in other embodiments it can be reconfigured on sequence boundaries. The cache may be flushed on each boundary to enable such reconfiguration.

26 Claims, 7 Drawing Sheets

DYNAMICALLY CONFIGURING A VIDEO DECODER CACHE FOR MOTION COMPENSATION

BACKGROUND

This invention relates generally to video compression and decompression.

Video images may be compressed so that they may be transmitted in a more compact, bandwidth efficient fashion. Generally, techniques for compression involve motion compensation.

In order to compress video, an algorithm examines a sequence of image frames to measure the difference from frame to frame in order to send motion vector information. The motion vector locates a block in a reference frame relative to a block being coded or decoded. Motion compensation is interframe coding that uses such an algorithm that makes use of redundancy between adjacent video frames.

Because motion compensation requires access to a large amount of data, frequent accesses to system memory may be required. The greater the requirements for system memory access, the higher the burden placed by the video compression and decompression apparatus on the host system. In addition, accessing external memory, like system memory, increases the bandwidth requirements of the video compression and decompression apparatus.

DETAILED DESCRIPTION

Figure 1:
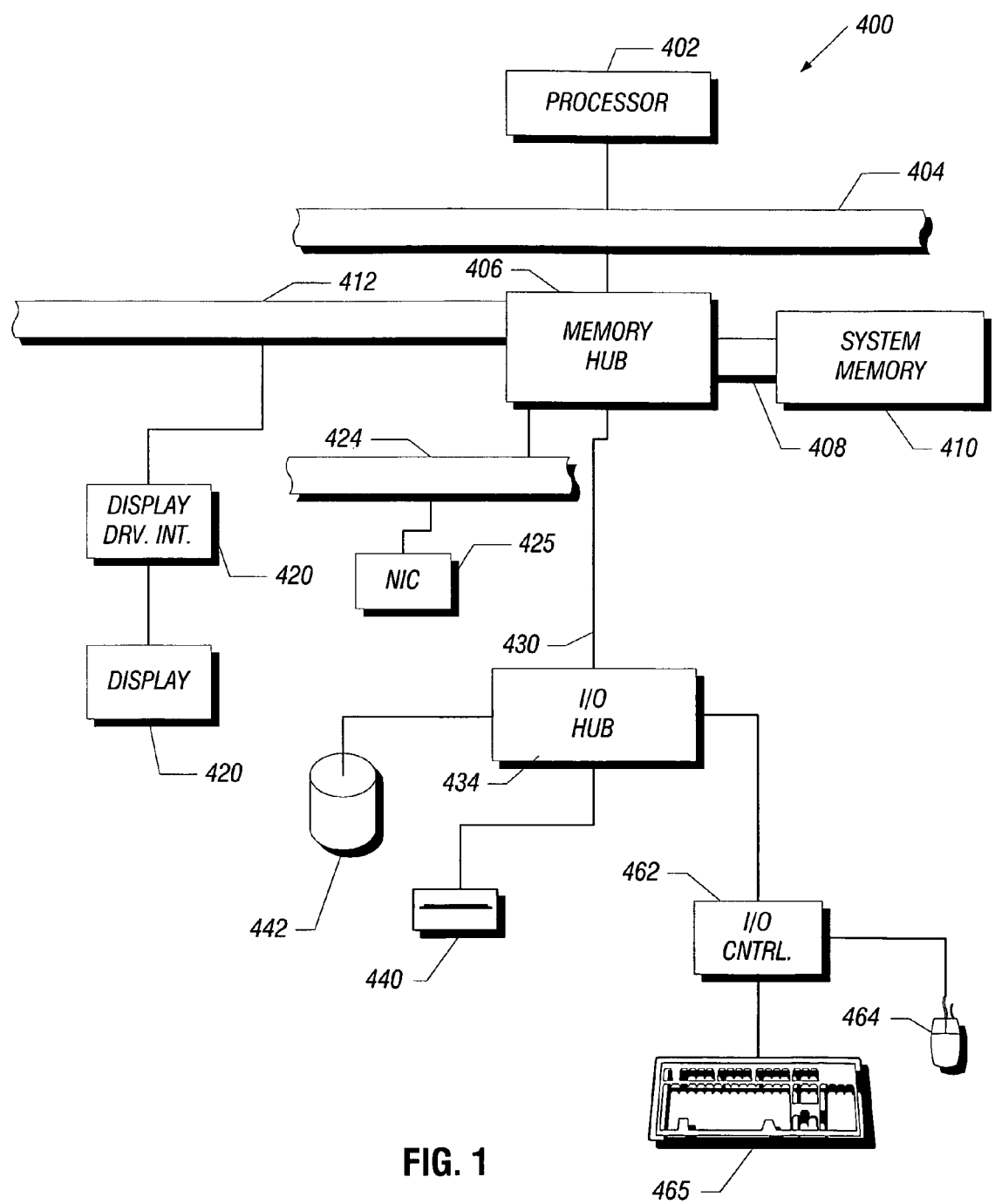
FIG. 1 is a depiction of a host system in accordance with one embodiment of the present invention.

Referring to FIG. 1, a processor-based system 400 may have one of a variety of architectures, including the one depicted in FIG. 1. The present invention is in no way limited to any particular system configuration, including that depicted in FIG. 1. For example, in some architectures, more than one processor may be utilized.

In some embodiments, the system 400 may be used in a set top box, a chipset that may be utilized in a variety of processor-based systems, or a system on a chip (SOC), to mention a few examples. The system 400 may, for example, process digital media and, particularly, digital video media, such as streaming video, digital video disk media, television broadcasts, and satellite broadcasts, to mention a few examples.

In some embodiments, a processor 402 or, in some cases, multiprocessors, may be coupled via a bus 400 to a memory hub or north bridge 406. The memory hub 406 may be coupled to a local bus 404. The memory hub 406 may establish communications between the processor 402, a system memory bus 408, an accelerated graphics port (AGP) bus 412, and a peripheral component interconnect (PCI) bus 424, in some embodiments. The AGP specification is described in detail in the accelerated graphics port interface specification, revision 1.0, published on Jul. 31, 1996, by Intel Corporation of Santa Clara, Calif. The PCI specification, revision 3.0, is available from the PCI special interest group, Portland, Oreg. 97214.

A system memory 410, such as a dynamic random access memory (DRAM), for example, is coupled to the system memory bus 408. The system 400 may include a display driver interface 414 that couples a display 420 to the AGP bus 412. Furthermore, a network interface card (NIC) 425 may be coupled to the PCI bus 424 in some embodiments. A hub link 430 may couple the memory hub 406 to a south bridge or input/output (I/O) hub 434. The I/O hub 434 may provide interfaces for the hard disk drive 442 and digital video disk (DVD) drive 440, for example. Furthermore, the I/O hub 434 may provide an interface to an I/O expansion bus 460. An I/O controller 462 may be coupled to the I/O expansion bus 460 and may provide interfaces for receiving input data from a mouse 464, as well as a keyboard 465, in some embodiments.

Figure 2:
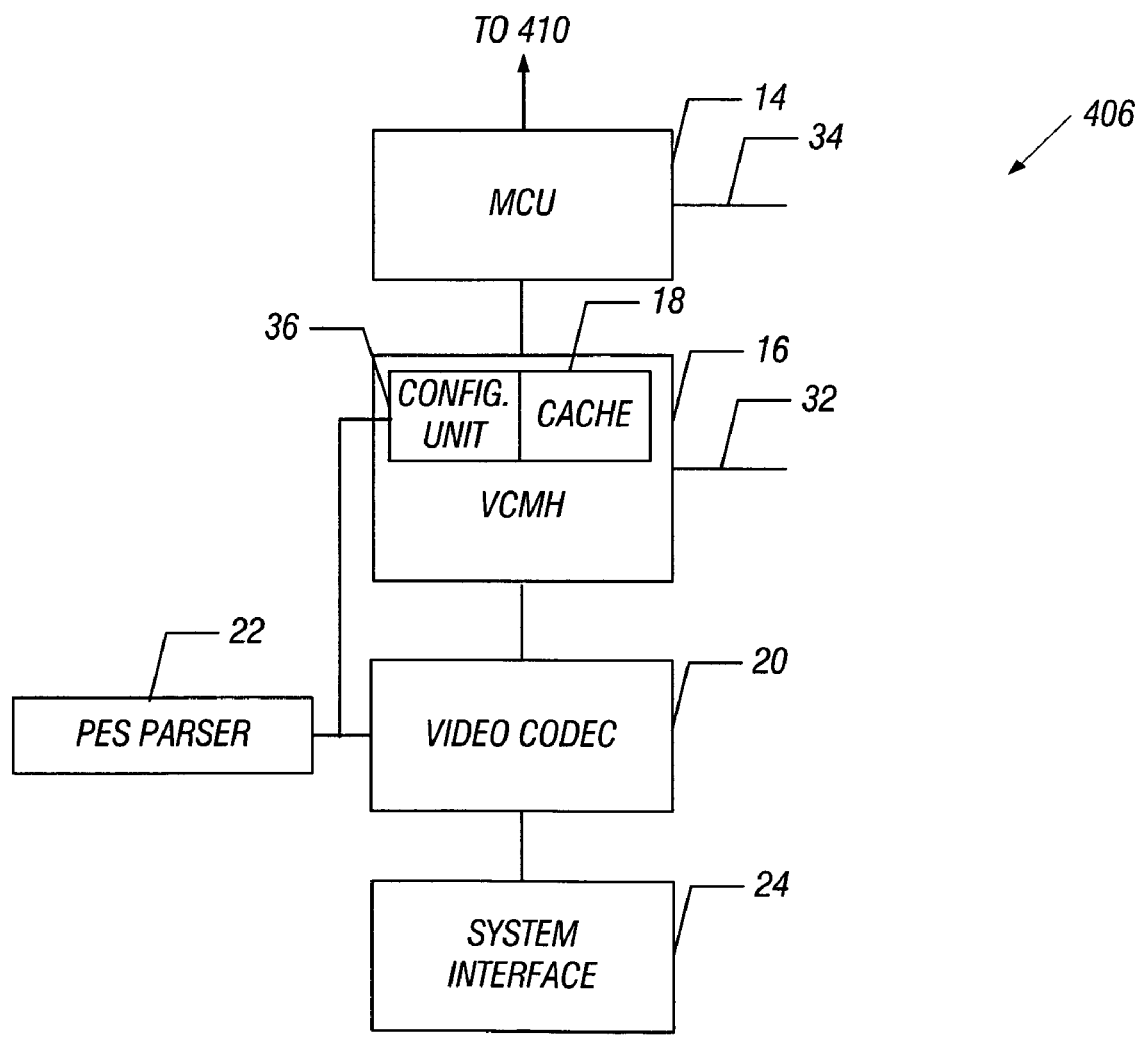
FIG. 2 is a depiction of the video compression and decompression apparatus used by the host system shown in FIG. 1 in accordance with one embodiment of the present invention.

Referring to FIG. 2, the memory hub 406 may include a system interface 24 to couple to the system 400. The interface 24 is coupled to a video coder/decoder (CODEC) 20 that handles video compression and decompression. The video coder/decoder 20 is coupled to a video CODEC memory hub 16 in the embodiment of FIG. 2. The video coder memory hub 16 may be coupled to various memory devices on a bus 32, for example. Finally, a memory controller unit 14 may be coupled to the system memory 410 in some embodiments. The memory controller unit 14 may be coupled by a bus 34 to other memory in some embodiments. Of course, a variety of other architectures may be used as well.

The video CODEC 20 receives video data from a packetized elementary stream (PES) parser 22. The PES parser 22 receives a compressed elemental video stream, parses it to separate certain information from motion compensation data, and provides the information to the video CODEC 20. It also provides certain information, including header information, to a configuration unit 36 included in the video CODEC memory hub 16. The configuration unit 36, in some embodiments, may be coupled to a video decoder cache 18. The cache 18 may be a volatile or non-volatile memory, such as a flash memory, static random access memory, or a dynamic random access memory, as two examples.

Examples of the type of information provided by the parser 22 to the configuration unit 36 include picture sequence type, such as interlaced or progressive, picture size in terms of height and/or width, and the frame or field decode settings, as well as the row position and column position of the currently active block for compression or decompression. A progressive scan displays all lines of a frame in one scan. An interlaced scan scans each frame twice. One field includes even lines and the other of the two fields making up a frame includes the odd lines.

The CODEC 20 may have a motion compensation unit that converts motion vectors to block addresses. The CODEC 20 issues block transfer reads to the video CODEC memory hub 16. The video CODEC memory hub 16 may convert the block transfers into individual memory transfer commands and checks for valid data in its cache 18.

Uncached data results in memory transfer commands being sent to the memory controller unit 14 for reading from the system memory 410. Cached data is serviced from the cache 18 itself, thereby realizing bandwidth savings by avoiding the need to make extra accesses to the system memory 410.

The video CODEC memory hub 16 may also service other CODECs over the bus 32. Likewise, the memory controller unit 14 may service other devices, such as the processor 402, over the bus 34.

The configuration unit 36 of the video CODEC memory hub 16 is responsible for configuring the cache 18 based on the type of data that is received from the parser 22, such as the picture type parameters (e.g. B-frame, P-frame). For example, depending on whether the motion compensation data is interlaced or progressive or, depending on other characteristics, the configuration unit 36 may reconfigure the cache 18 to best accommodate the data expected based on the characteristic information received from the parser 22.

For example, in some embodiments, the configuration unit 36 may only reconfigure the cache on sequence boundaries. Sequence boundaries may include a number of frames or pictures that have certain common motion compensation parameters. A sequence boundary is the point between two successive frames or pictures when the common parameter changes. In other embodiments, the configuration unit 36 may reconfigure the cache 18 on a picture or frame boundary. The location of sequence or picture boundaries may be determined from the data that the PES parser 22 removes from the elemental video stream headers in some embodiments.

In order to reconfigure the cache 18 on picture or sequence boundaries, it is desirable, in some embodiments, to flush the motion compensation data from the cache 18 on those boundaries. In some embodiments, the flushing may be accomplished without adversely affecting the cache 18 performance in a significant way. Thus, the cache performance may be optimized, in some embodiments, for specific characteristics or attributes of the motion compensation data, such as P or B type pictures, with respect to the next frame or picture to be decoded. Specific cache parameters may be identified that enable dynamic configuration based on the input picture characteristics.

Because of the size of video pictures and because motion compensation algorithms work their way across and down the picture data, the data at the top of the picture inevitably is replaced in the cache 18 by the time the bottom of the picture has been processed. At the end of the picture processing, the cache 18 contents may be unusable at the beginning of the next picture. Therefore, the cache can be globally flushed to invalidate all cache lines and the cache 18 may be reconfigured in a way that its performance may be optimized for the specific characteristics of the next picture to be decoded, in some embodiments.

The performance of the cache 18 may depend upon the ability to store spatially close data to enhance the cache hit rates. The more often the cache 18 has the information that the CODEC 20 needs at any particular time, the more useful is the cache 18 and the more efficient is the system 40.

A video frame is two-dimensional and, therefore, in connection with motion compensation data, spatially adjacent data for video frames means that the data is adjacent in horizontal and/or vertical directions. That is, data from adjacent rows or columns may be spatially adjacent for cache optimization purposes in some embodiments. Generally, performance may be enhanced if spatially adjacent data is stored in a given cache line.

In some motion compensation schemes, such as the VC-1 or Microsoft Windows® Media 9, the exact definition of what data is closest spatially in the vertical direction changes based on the type of picture being decoded.

For progressive scan sequences, motion compensation logic refers to data from previous frames, including both fields of a frame. Hence, in this case, data from adjacent rows of samples in a reference frame is spatially adjacent in a vertical direction, even though the alternate rows of data belong to separate fields.

However, for interlaced scan sequences, motion compensation logic refers data from one or more fields separately. If more than one field is referred to, then it is also possible that the fields belong to different frames. Hence, in this case, data from adjacent rows of samples in a reference field may be spatially adjacent in the vertical direction.

Figure 3:
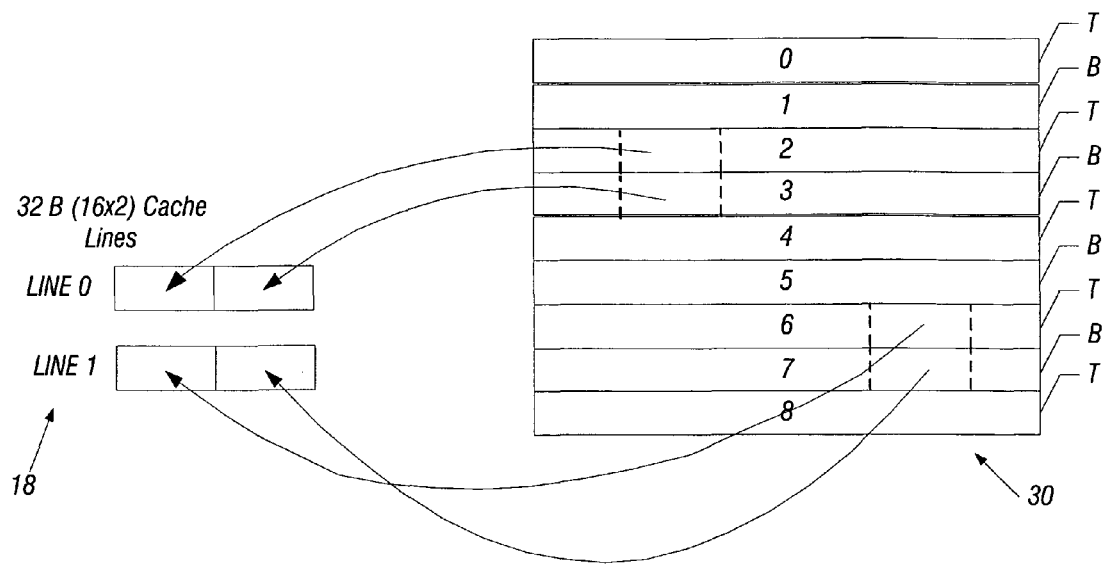
FIG. 3 is a schematic depiction of how a cache may be configured, depending on a characteristic of the motion compensation data, in accordance with one embodiment of the present invention.

Thus, referring to FIG. 3 for a simplified progressive scan example, data may be stored in two cache 18 lines, denominated line 0 and line 1. The two fields of a reference frame, stored in memory, are stored in an interleaved fashion in a common buffer 30. The top field "T" consists of the even numbered rows 0, 2, 4, etc. and the bottom field "B" consists of the odd rows 1, 3, 5, etc. In some cases, a cache line may be 32 bytes and may store 16 samples with spatially adjacent rows.

Spatially adjacent may mean adjacent rows of the same frame. Then, the spatially adjacent rows belong to different fields of the same frame. It does not matter if the two reference fields are stored in external memory in separate buffers or in a common buffer, as long as the memory controller fetches the 16 bytes of data for each field.

Thus, cache line 0 receives data from row 2 and row 3, which are vertically adjacent. Cache line 1 receives data from row 6 and row 7, which are also vertically adjacent.

Figure 4:
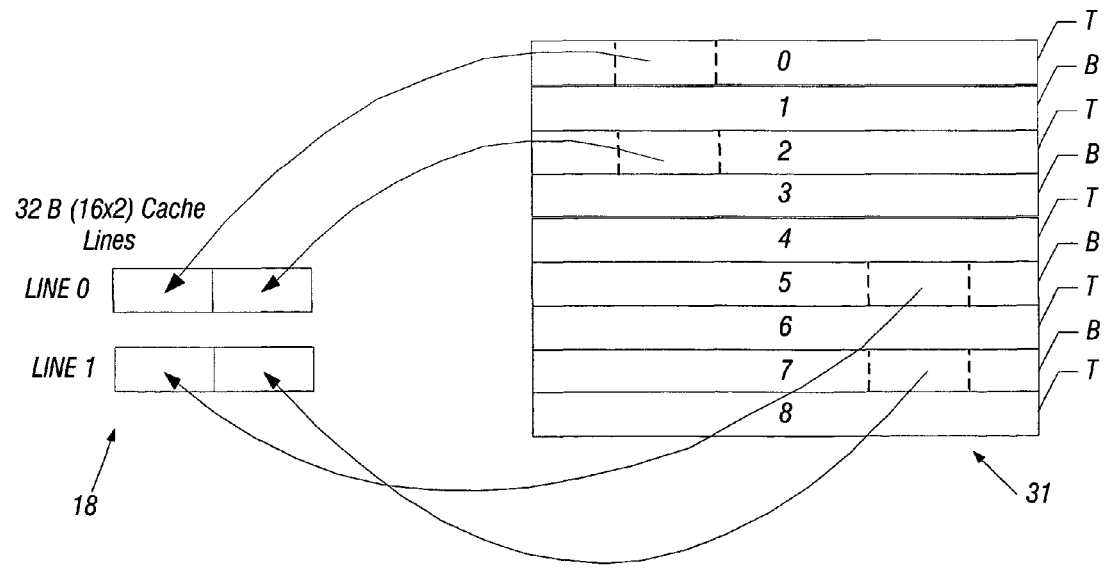
FIG. 4 is a depiction of another way that a cache may be configured, depending on a characteristic of the motion compensation data, in accordance with another embodiment of the present invention.

FIG. 4 is a depiction of a simplified example for interlaced scan data. FIG. 4 is an example of storage of data in two cache 18 lines, line 0 and line 1. Two fields of a reference frame are stored in interleaved fashion in a common buffer 31. The top field "T" includes the even numbered rows 0, 2, 4, etc. and the bottom field "B" includes the odd numbered rows 1, 3, 5, etc.

A cache line may, in one embodiment, be 32 bytes and store 16 sample bytes from spatially adjacent rows. In this case, spatially adjacent means that the adjacent rows are from the same field, the spatially adjacent rows belonging to the same fields of that frame.

It does not matter if the two reference fields are stored in the external memory in separate buffers or in a common buffer, as long as the memory controller fetches the data from both fields.

Where only one reference field is used to code or decode the picture, if the previous data line assignment is used, it would mean that fifty percent of the cache space is definitely wasted, as one-half of each cache line would consist of unusable data. As shown in FIG. 4, the rows 0 and 2 are vertically displaced, but are vertically adjacent and are both placed in line 0. Similarly, rows 5 and 7 are considered vertically adjacent and are placed in line 1 of the cache.

Thus, the configuration of the cache 18 may be changed depending on whether interlaced data is involved, as was the case in FIG. 4, or progressive data is involved, as was the case in FIG. 3. The memory system, including the MCU 14 and VCMH 16, may also be configured to fetch data from the same field or an adjacent field based on progressive or interlaced scan.

Figure 5:
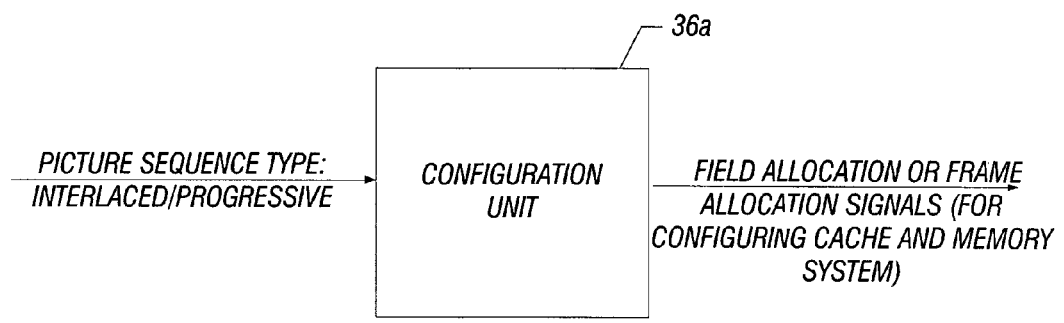
FIG. 5 is a schematic depiction of a configuration unit that may be utilized in the system shown in FIG. 2 in accordance with one embodiment of the present invention.

The configuration unit 36 may control the cache 18 and, particularly, how the cache 18 is addressed in some embodiments. The configuration unit 36a, for example, as shown in FIG. 5, receives a picture sequence type, either interlaced or progressive. Based on that information, it appropriately configures a cache 18, for example, as illustrated in FIG. 3 or 4. In one embodiment, the configuration unit 36a may include a set of registers programmed by another processor. In the case of interlaced data, the coder/decoder 20 processes by field, not by frame. There are two fields per frame. One field may be decoded at a time. When decoding a block of a field and the previous frame must be examined, the coder/decoder 20 wants to see a particular field, not the whole frame.

In the cases of non-interlaced or progressive scan data, both fields may be displayed together. When the coder/decoder 20 is coding or decoding a frame, it needs to look at a previous frame in order to decode.

Thus, referring to FIG. 5, the output of the configuration unit 36a may be signals that indicate frame or field allocation and those signals configure the cache lines and memory system.

Figure 6:
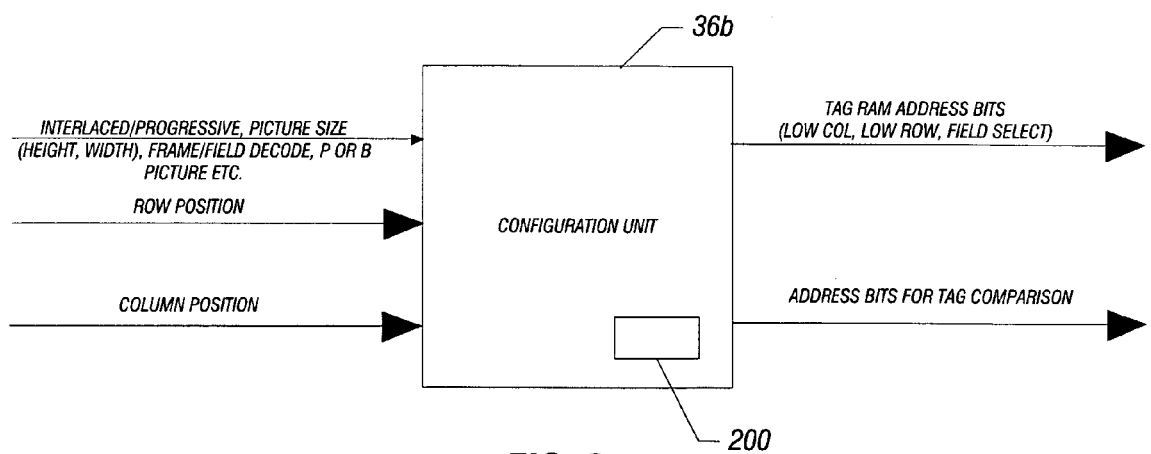
FIG. 6 is a schematic depiction of a configuration unit that may be utilized in the embodiment shown in FIG. 2 in accordance with another embodiment of the present invention.

Referring to FIG. 6, in accordance with another embodiment of the present invention, the configuration unit 36b may be controlled by a control 200. The control 200 may be software, hardware, or firmware. The configuration unit 36b may receive the row and column positions of an actively processed block of data such as an 8×8, 16×16, or other sized data block. The row and column positions are the position of the upper, left-most pixel of the block in question.

The configuration unit 36 may also receive from the parser 22, information about whether the motion compensation data is for interlaced or progressive scan, the picture size including height and width, the frame or field decode, and if it is a P or B picture, in some embodiments. Thus, in the case of interlaced scan data, the data always uses field decoding, but, in the case of progressive scans, either field or frame decoding may be specified.

The configuration unit 36b outputs the tag random access memory (RAM) address bits. The tag RAM address bits may include lower order column, lower order row, and field select bits in one embodiment. It also outputs the higher order address bits for tag comparison.

Figure 7:
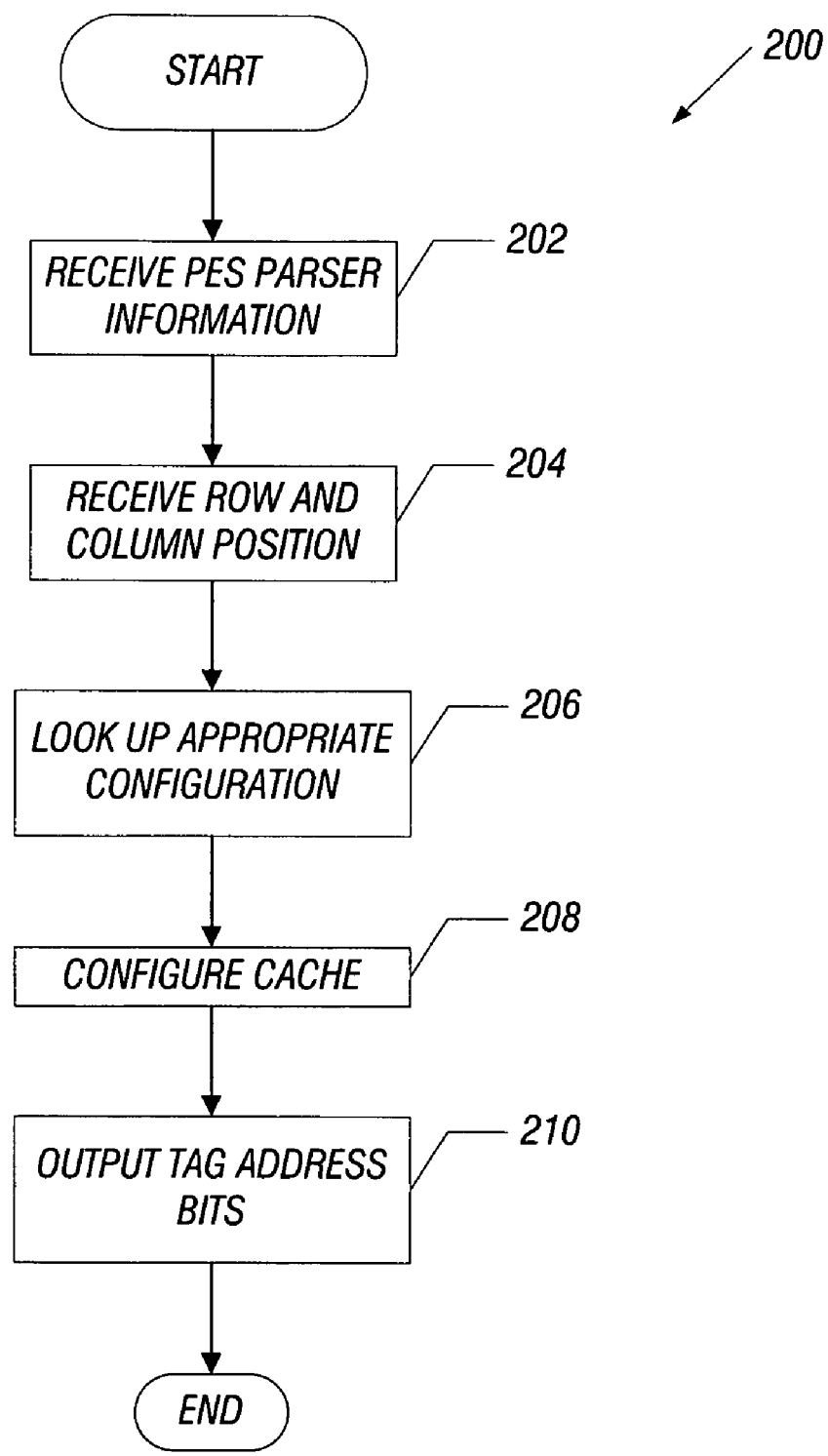
FIG. 7 is a flow chart for a tag RAM in accordance with one embodiment of the present invention.

Thus, referring to FIG. 7, the process 200 may be implemented in hardware, software, or firmware. The control 200 begins by receiving the PES parser 22 information about the type of motion compensation data as indicated in block 202. It also receives the row and column position information as indicated in block 204. The appropriate configuration may be looked up in a look-up table or register as indicated in block 206 in some embodiments. Then, the cache 18 may be configured appropriately as indicated in block 208. The tag address bits may be output as indicated in block 210.

Figure 8:
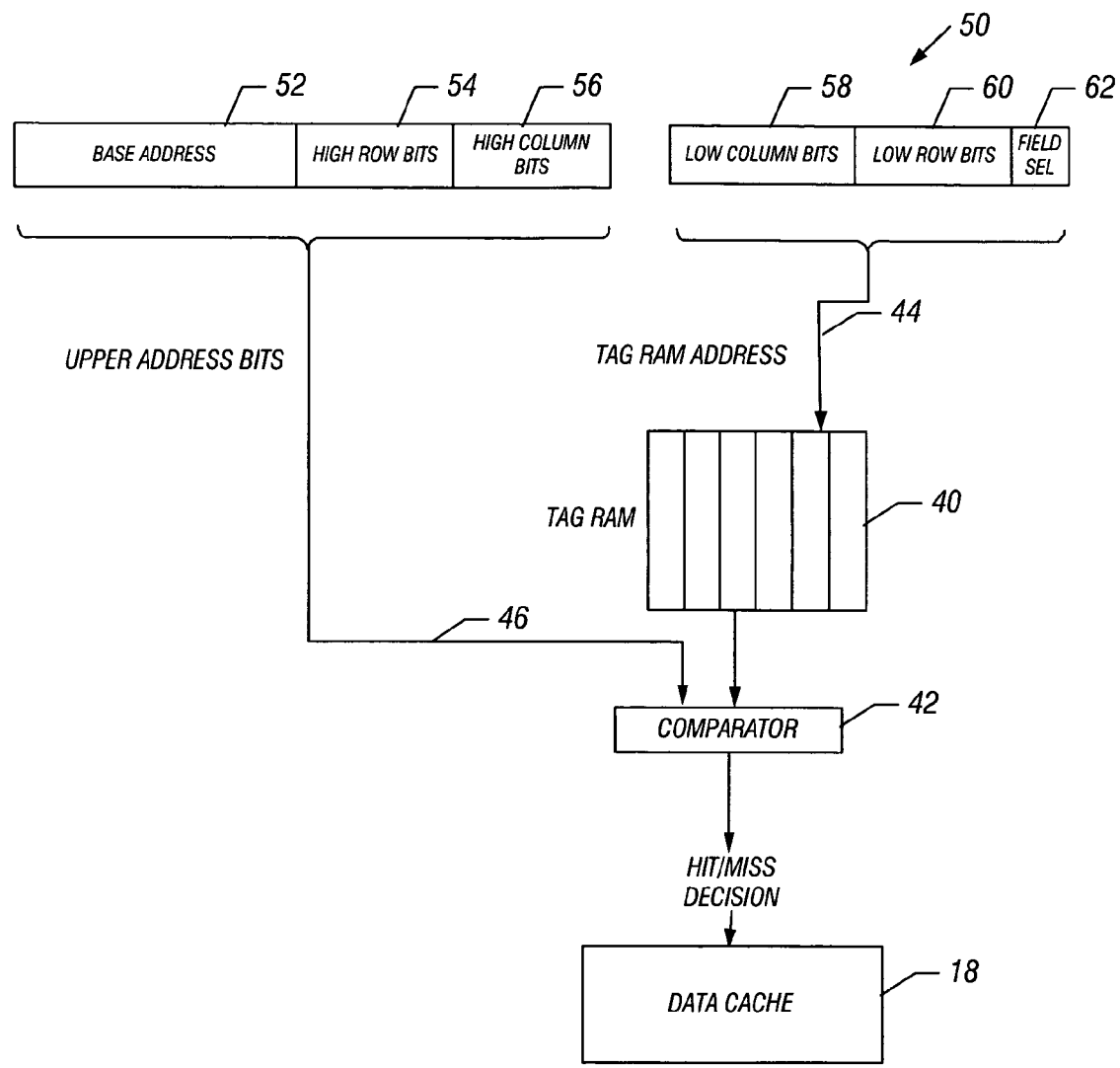
FIG. 8 is a schematic depiction of a tag RAM in accordance with another embodiment of the present invention.

Referring to FIG. 8, the tag RAM 40, which may be external to or part of the cache 18, may be addressed as depicted in one embodiment. The tag RAM may store data in a plurality of logical or physical slots. The slot stored data corresponds to the higher order address bits of the motion compensation data being accessed by the lower order bits. The tag RAM 40 receives, on line 44, the lower order column bits 58, the lower order row bits 60, and a field select bit 62 and outputs the corresponding higher order bits.

In some embodiments, a single field select bit 62 may be utilized and, in other embodiments, two field set bits may be utilized. The field select bit(s) 62 may be one or more bits that indicate whether a low or high field is involved to distinguish similar data for adjacent fields.

The tag RAM 40 receives lower order column and lower order row bits as both rows and columns may be adjacent because of the two-dimensional nature of the motion compensation data. A comparator 42 receives the higher order address bits stored in the tag RAM slot selected by the lower order bits. The comparator 42 receives the actual higher order row and column address bits 54 and 56, as well as the base address 52. If the higher order address bits on the line 46 match the output from the tag RAM 40, as determined by the comparator 42, a cache hit is detected and the data is in the data cache 18. Conversely, if they do not match, a cache miss is involved and the data must be obtained from external memory such as the system memory 410.

The optimal number of column and row address bits used to address the tag RAM 40 is a function of the input picture characteristics, including frame size, picture type, and the like, in addition to cache parameters, such as cache size and associativity. A typical implementation may use a table driven approach to invoke the optimal column and row bit assignments for generating the Tag RAM addresses.

For interlaced pictures, individual fields may be referenced for a reference frame. Based on picture types, one to four fields may be referenced. More than two fields may be involved in cases where there are field coded P pictures and field coded B pictures, for example. However, for motion compensation of any block that refers multiple fields, it is likely that the data is being fetched from similar offsets, both vertical and horizontal, within the fields. This increases the likelihood of cache conflicts.

By using the field select bits 62 for Tag RAM addresses, those conflicts may be reduced as the cached space effectively becomes partitioned into multiple smaller spaces and mapped to the separate fields or groups of fields. The tradeoff in this approach is that while conflicts are reduced, partitioning of the cache may increase capacity misses. The decision to use field select bits and, particularly, the number of field select bits that may be utilized (0 to 2) may be based on the input picture type parameters, including whether the parameters are progressive, interlaced, P or B pictures, the picture sizes as well as the cache size and associativity. In general, for lower associativity caches, better performance may tend to occur with more field based partitioning of caches.

Figure 9:
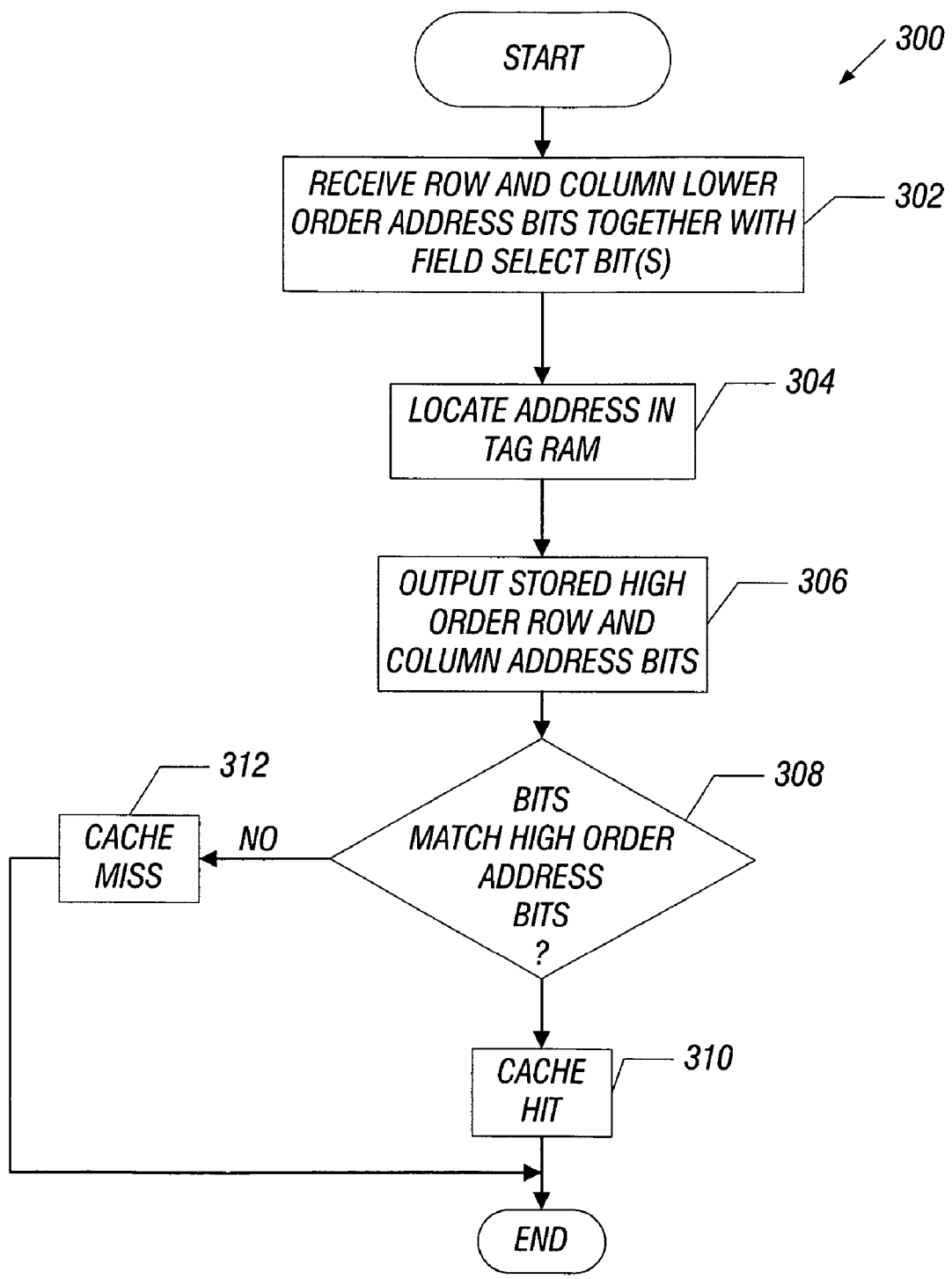
FIG. 9 is a flow chart for reconfiguring a video decoder cache in accordance with one embodiment of the present invention.

Thus, referring to FIG. 9, a process 300, which may be implemented in software, hardware, or firmware, begins by receiving row and column lower order address bits, together with field select bits, as indicated in block 302. The appropriate address is located in the tag RAM 40 as indicated in block 304. Specifically, the correct slot for the lower address and field select bits is identified.

Then, an address stored in the slot is output, giving the higher order row and address bits as indicated in block 306. A check at diamond 308 indicates whether the output bits match the higher order address bits on the line 46 (FIG. 8). If they do match, then a cache hit is indicated in block 310 and, otherwise, a cache miss is recorded as indicated in block 312. In the case of a cache miss, an external memory or system memory is accessed instead of quickly accessing the information from the cache 18.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting the type of motion compensation data that is to be processed by a video decoder; and
   selectively flushing a video decoder cache on frame or sequence boundaries depending on the type of data to be processed.

2. The method of claim 1 wherein detecting the type of data includes detecting whether the data is interlaced or progressive.

3. The method of claim 2 including receiving information from a packetized elementary stream parser to determine the type of data.

4. The method of claim 1 wherein said cache is reconfigured to store data from successive adjacent lines of scanned data.

5. The method of claim 3 wherein said cache is configured to receive successive even lines in one cache line and successive odd lines in another cache line.

6. The method of claim 1 including receiving an indication of a block position and whether the block is interlaced or progressive scanned and outputting an indication of tag random access memory address bits in the form of lower order column and lower order row bits.

7. The method of claim 6 including using said lower order column and lower order row bits to access a tag random access memory, receiving from the tag random access memory the higher order row and column bits and comparing those bits to the received address of a data access.

8. The method of claim 7 including receiving a field select bit and using said field select hit to identify a location within a tag random access memory.

9. The method of claim 1 including reconfiguring the video decoder cache depending on whether motion compensation data refers to both fields of a frame of scanned data or only one field of said frame.

10. The method of claim 1 including flushing said cache in connection with reconfiguring said cache.

11. The method of claim 1 including reconfiguring said cache on a frame boundary.

12. The method of claim 1 including reconfiguring said cache on a sequence boundary.

13. A method comprising:
    detecting whether data to be processed in a video decoder is interlaced or progressive;
    dynamically reconfiguring the video decoder cache depending on whether the data is interlaced or progressive; and
    receiving an indication of a block position and whether the block is interlaced or progressive scanned and output an indication of tag random access memory address bits in the form of lower order column and lower order row bits.

14. The method of claim 13 including receiving information from a packetized elementary stream parser to determine the type of data.

15. The method of claim 13 including reconfiguring said cache to store data from successive adjacent lines of scanned data.

16. The method of claim 14 including reconfiguring said cache to receive successive even lines in one cache line and successive odd lines in another cache line.

17. The method of claim 13 including using said lower order column and lower order row bits to access a tag random access memory, receiving from the tag random access memory the higher order row and column bits and comparing those higher order row and column bits to the received address of a data access.

18. A system comprising:
    a cache; and
    a configuration unit coupled to said cache, said configuration unit to selectively flush the cache on frame or sequence boundaries depending on a type of data to be decoded.

19. The system of claim 18, said unit to detect whether data to be stored in the cache is interlaced or progressive scanned data and to reconfigure the cache depending on whether the data is interlaced or progressive scanned.

20. The system of claim 18 wherein said configuration unit to reconfigure the cache depending on whether motion compensation data refers to both fields of a frame of scanned data or only one field of said frame.

21. The system of claim 18, said cache including a tag random access memory storing information about the higher row and column address bits of motion data and being indexed by lower row and column address bits, said tag random access memory including a comparator to compare information about higher row and column address bits with the information from the tag random access memory to determine whether data is cached in said cache.

22. The method of claim 18 including dynamically reconfiguring the video decoder cache depending on the type of data to be processed.

23. The system of claim 18, said configuration unit to dynamically reconfigure the cache depending on a type of data to be decoded.

24. A method comprising:
    detecting the type of compensation data that is to be processed by a video decoder;
    dynamically reconfiguring a video decoder cache depending on the type of data to be processed; and
    receiving an indication of a block position and whether the block is interlaced or progressive scanned and outputting an indication of tag random access memory address bits in the form of lower order column and lower order row bits.

25. The method of claim 24 including using said lower order column and lower order row bits to access a tag random access memory, receiving from the tag random access memory the higher order row and column bits and comparing those bits to the received address of a data access.

26. The method of claim 25 including receiving a field select bit and using said field select bit to identify a location within a tag random access memory.

* * * * *

UNITED STATES PATENT AND TRADEMARK OFFICE
CERTIFICATE OF CORRECTION

| | | |
|---|---|---|
| PATENT NO. | : 7,924,914 B2 | Page 1 of 1 |
| APPLICATION NO. | : 11/231077 | |
| DATED | : April 12, 2011 | |
| INVENTOR(S) | : Rahul Saxena | |

It is certified that error appears in the above-identified patent and that said Letters Patent is hereby corrected as shown below:

Column 7:
Line 41, "select hit to identify" should be --select bit to identify--.

Signed and Sealed this
Twenty-first Day of June, 2011

David J. Kappos
*Director of the United States Patent and Trademark Office*